United States Patent Office 3,410,304
Patented Nov. 12, 1968

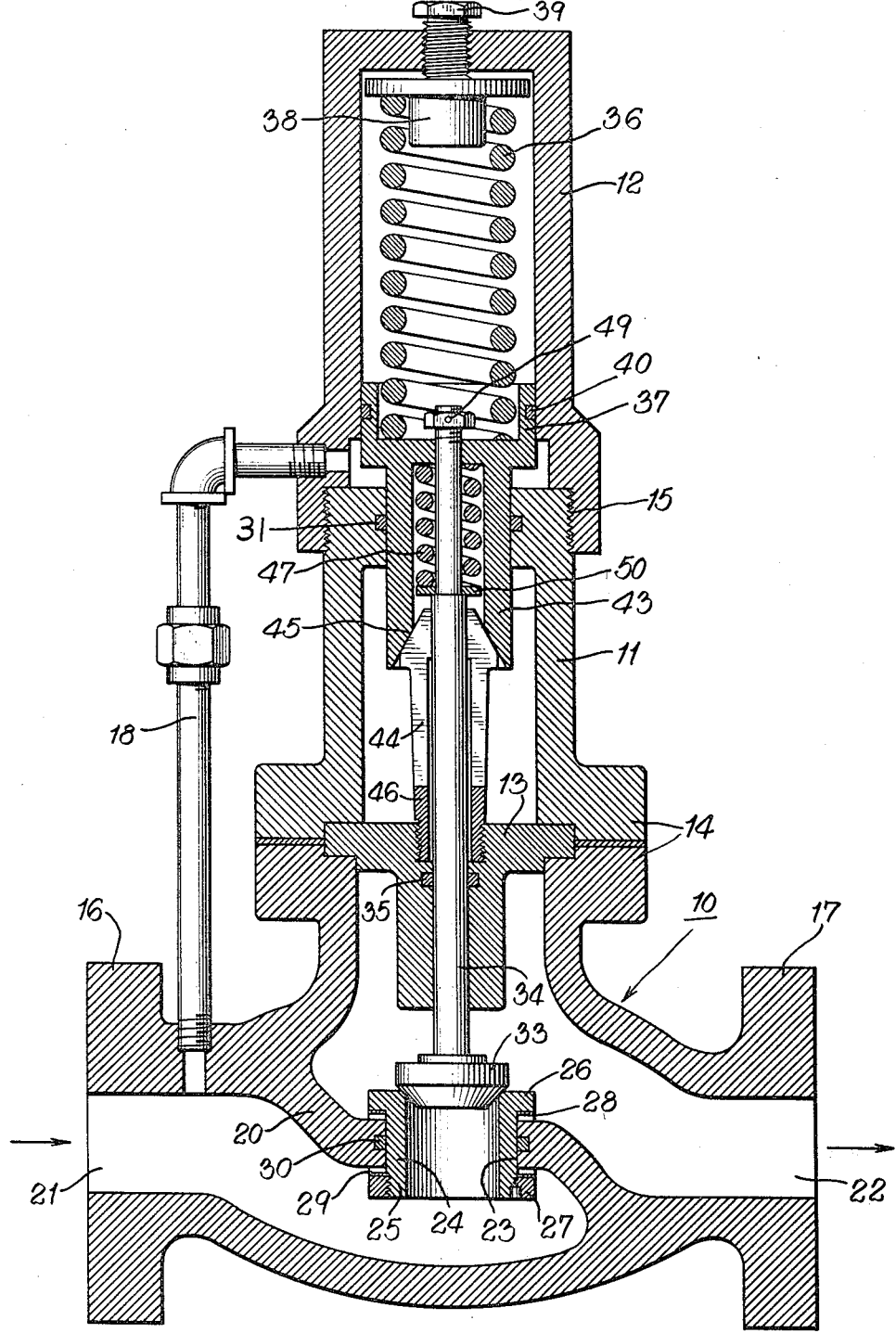

3,410,304
RELIEF VALVES
Herman L. Paul, Jr., Stamford, Conn.
(Box 388, Ansonia Station, New York, N.Y. 10023)
Filed Jan. 19, 1966, Ser. No. 521,608
4 Claims. (Cl. 137—494)

The invention relates to valves for controlling fluid flow and more particularly to sudden-opening valves which open suddenly wide when a predetermined fluid pressure is exceeded.

Sudden-opening discharge valves are distinguished from throttle valves, in that the sudden-open valve operates either fully closed or fully open. Safety valves, such as used with steam boilers, are of the sudden-open type. Prior sudden-open valves are open to the objection of "simmering" at or around the pressure at which they are set to open. This simmering allows fluid to escape, causes wire drawing, noisy chattering, premature wear and is otherwise objectionable. In fact, with conventional relief valves it is common practice to set the opening or design pressure at approximately 10% above operating pressure, which is assumed to be the upper limit of the system operating pressure.

An object of the present invention is to overcome the above objections. The present invention overcomes the objections of prior valves by utilizing a friction clutch which positively holds the valve closed until the pressure increases to design pressure, at which point the friction clutch suddenly releases, allowing the valve to move suddenly from fully closed to fully open position with a rush. The design pressure of the present valve may be only a small percent above the operating pressure.

Other objects and features of the invention will be more apparent from the following description when considered with the accompanying drawings in which:

The single figure is a longitudinal cross-section through a valve according to the invention.

In the accompanying drawing and the following description forming part of this specification, certain specific disclosure of the invention is made for purposes of explanation, but it will be understood that the details may be modified in various respects without departure from the broad aspect of the invention.

Referring now to the drawing, the relief valve comprises in general, a body 10, a bonnet 11, a control cylinder 12, and an internal guide 13. A flange coupling 14 connects bonnet and body, and a screw thread coupling 15 connects control cylinder and bonnet.

The body 10 has a partition 20 which divides the body into an inlet passage 21 and an outlet passage 22. The partition has a circular opening 23 having a sliding seat member 24. The body has a connecting flange 16 for connection to a source of high pressure, such as a steam boiler. The body has a connecting flange 17 for connection to a location receiving the steam which the valve is to release from the system.

The sliding seat 24 comprises a sleeve 25 having a collar 26 and a pinned nut 27. A spring washer 28 is disposed between collar 26 and the partition 20, and a spring washer 29 is disposed between the nut 27 and the partition 20. A seal 30 in partition 20 seals sleeve 25. The construction is such as to permit a limited up-and-down movement to the seat 24 under the influence of the fluid pressure and the pressure exerted by the valve disk 33.

The closure comprises a disk 33, having a stem 34 slidably mounted in support 13 and sealed with respect thereto by a seal 35 in the support. Disk 33 has a conical surface engaging a conical surface on seat 24.

The control cylinder 12 houses a helical main spring 36, operating between a cupped piston 37 and a centering abutment 38. An adjusting screw 39 is threaded into the end of cylinder 12 against abutment 38 to adjust the tension on spring 36. Piston 37 carries a seal 40 bearing against the cylinder 12. Control pipe 18 connects inlet 21 and the lower end of control cylinder 12 to apply inlet fluid pressure under piston 37.

Control piston 37 has a hollow rod or clamp sleeve 43 slidably mounted in bonnet 11. Sleeve 43 has a bevelled surface engaging a bevelled surface 45 on a split collet 44. Collet 44 has a solid lower ring 46 threaded into support 13 with four fingers whose ends carry the bevels 45.

Within the hollow rod 43 is a compensating spring 47. This spring operates between a lower washer 50 resting against a shoulder on stem 34 and against the upper end of the hollow rod 43. Rod 43 has limited movement with respect to spindle 34 between the abutment formed by the compensating spring 47 (when fully compressed) and a pinned nut 49 on stem 34. The support 13 contains a seal 35 bearing against spindle 34 and bonnet 11 contains a seal 31 bearing against sleeve 43.

It will be understood that, in the operation of the valve, the axial movement of hollow rod 43 and piston 37 acts to clamp and unclamp the collet 44 against the stem 34. In the closed position shown in the drawing, the main spring 36 has forced the piston 37 and hollow rod 43 down against bevelled surface 45 to squeeze the split collet 44 inwardly to frictionally grip the stem, with the disk 33 down against the spring pressed seat 24, and with the compensating spring 36 in partially compressed condition.

When the valve assumes open position, the compensating spring 47 expands. This relative longitudinal movement of stem 34 and piston 37 ensures closing engagement of the valve disk 33 with its seat 24 before the clamp sleeve 43 engages the collet 44 to lock the valve closed.

The compensating spring 47 must therefore be weak enough to permit the main spring 36 to compress it after the valve disk 33 engages the seat 24. The compensating spring 47 must be strong enough to expand against the reduced fluid pressure under disk 33, when the valve is open, so as to ensure engagement of the disk 33 against the seat 24 prior to locking of the valve by engagement of the clamp sleeve 43 with the collet 44.

Before being put into operation the relief valve will be calibrated by rotating the adjusting screw 39 to effect relief opening at the desired steam pressure. The adjusting screw 39 adjusts the tension on the main spring 36 and thus controls the force required to move piston 37 sufficiently to release the friction clamp on stem 34.

Operation

For purposes of explanation, it will be assumed that the relief valve is used in a steam generating plant which has a system operating pressure of 1,000 lbs. gage. In this explanation, in the absence of express statement to the contrary, it will be understood that all pressures are gage pressures. In the present example, the design or blow-off pressure of the relief valve is 1,025 lbs. and the reseating pressure is 820 lbs.

The system will normally run at the operating steam pressure of 1,000 lbs. However, if this pressure builds up to 1,025 lbs., the force under the main piston 37 becomes sufficient to overcome the main spring 36. The main piston 37 then moves upwardly, disengaging the clamp cylinder 43 from the collet 44. This releases the valve stem 34 which allows the steam pressure under the valve disk 33 to push the disk upwardly. This pressure applies additional force to the main piston 37, causing the entire piston and valve disk assembly to move upwardly with a rush; this allows the steam to escape and the pressure to be relieved. The seat 24 also moves upwardly a limited amount.

The valve will remain fully open until the steam pressure decreases to some predetermined value, such as 820 lbs., at which pressure the valve closes. As the steam pressure decreases, the force of the main spring 36 pushes the main piston 37 and valve disk assembly downwardly. The reduced fluid pressure under the disk 33 permits expansion of the compensating spring 47 so that by the time the fluid pressure is reduced to 820 lbs., the valve disk 33 engages its seat 24 after which the clamp sleeve 43 engages the collet 44 to lock the valve stem 34.

The locking engagement of the clamp cylinder and collet against the valve stem transfers the opening force, due to steam pressure under the valve disk, from the piston 37 to the fixed guide 13. The result is that the main spring 36 must now overcome only the steam pressure under the piston, which ensures a firm wedging action between the clamp sleeve 43 and the collet 44, tightly pressing the collet against the valve stem 34, frictionally holding it firmly in place.

The operation of the invention may be better understood from the following, which is to be taken purely as an illustration to assist in understanding the invention and not in any limiting sense.

Assume that the piston 37 has an effective area of 4 sq. in.; that the valve disk 33 has an effective area of 1 sq. in.; that the design or blow off pressure is 1,025 lbs. per sq. in.; that the system operating pressure is 1,000 lbs. per sq. in.; and that the reseating pressure is 820 lbs. per sq. in.

At system operating pressure of 1,000 lbs. per sq. inch, the force applied under the main piston 37 is 4,000 lbs., which is not enough to overcome the force of the main spring 36, which requires a force of 4,100 lbs. to overcome it. The force applied under the valve disk is 1,000 lbs. but this force is not transmitted to the main spring because of the friction lock.

As the operating pressure rises to 1,025 lbs. per square inch, the force applied to the control piston 37 becomes 4,100 lbs., which is sufficient to compress the main spring 36 sufficiently to release the friction lock. This permits the valve disk 33 to rise (compressing compensating spring 47) which applies an additional force of 1,025 lbs. to the main spring and to open the valve widely with a rush.

Upon decrease in steam pressure from 1,025 lbs. to 1,000 lbs. per square inch, the force operating against the compensating spring 47 decreases (permitting it to expand) and the total force operating against the main spring 36 decreases to 5,000 lbs., which is sufficient to hold the main spring partially compressed. And the valve remains open.

However, when the operating pressure decreases to 820 lbs. per sq. inch, the force operating against the compensating spring 47 decreases to 820 lbs. and the force operating against the main spring 36 decreases to 4,100 lbs., at which point the main spring is able to move both the main piston and disk downwardly, which first closes the valve and then clamps the friction lock.

As soon as the friction lock becomes effective, the force operating against the main spring 36 is reduced to 3,280 lbs. because the force applied under the disk 33 is no longer effective to compress the main spring.

As the fluid pressure rises back to the normal system operating pressure of 1,000 lbs. per sq. inch, the force operating under the main piston 37 increases to 4,000 lbs. which is not sufficient to compress the main spring 36 and thus release the friction lock. As the system operating pressure reaches 1,025 lbs. per sq. inch, the force applied to the main piston 37 reaches 4,100 lbs. which is sufficient to compress the main spring 36 enough to release the friction lock. And the valve opens.

It will be understood that in the above example the main spring 36 is assumed to exert a pressure of 4,100 lbs. to hold the bevelled surfaces 45 together and to clamp the friction lock. This pressure being critical, it will be understood that as soon as the force applied to the main spring 36 reaches a value slightly above 4,100 lbs., the spring will compress; and that when the force applied to the main spring 36 decreases to a value just under 4,100 lbs., the spring expands sufficiently to lock the friction lock.

The invention has important advantages. The full seat load between disk and seat is maintained right up until the instant of release just at design pressure of 1,025 lbs. This is in direct contrast to conventional safety valves, where the spring pressure must be set at approximately 10% above operating pressure, because the valve would otherwise simmer or chatter at operating pressure, allowing fluid to escape and thus causing wire drawing. The disk according to the invention cannot simmer because it is mechanically held by the friction clutch right up to design pressure, at which point the clutch releases and the valve disk opens with a rush to full opening, thus permitting the fluid pressure to decrease rapidly to a safe value. Furthermore, the friction lock is entirely free of latches or mechanical inter-engaging shoulders which might accidentally fail to disengage when set pressure is exceeded, and which thus would render the safety valve ineffective.

It will be understood that the fluid pressure which controls the valve may be obtained from sources other than the upstream side of the valve as shown. For example, the control pipe 18 may be connected to the downstream side 22 of the valve or to a point entirely removed from the present system.

With the control pipe connected to the downstream side of the valve, the valve may be used to maintain downstream pressure in a desired range. In this case, the control pipe 18 may be connected to the top of the control cylinder 12 instead of at the bottom which would then be closed, and the main spring 36 may be placed between the main piston 37 and the bottom of the control cylinder.

When the control pipe 18 is connected to a point outside the present system, the opening and closing valve may be controlled from any desired source.

While certain novel features of the invention have been disclosed herein, and are pointed out in the annexed claims, it will be understood that, in accordance with the doctrine of equivalents, various omissions, substitutions and changes may be made by those skilled in the art without departing from the spirit of the invention.

I claim:

1. In a valve, a case having a valve seat, a closure seatable on said seat, a friction device for holding said closure in closed position, means to apply force to said friction device, a control member for releasing said force-applying means.

2. In the valve of claim 1, said control member comprising a sensing member under control of fluid pressure, said sensing member acting to release said force-applying means when said fluid pressure is changed.

3. In the valve of claim 2, said case having a partition, an inlet on one side of said partition and an outlet on the other side of said partition, said partition having an opening, said valve seat being moveably mounted in said opening, said valve closure having a disk and a stem, said friction device comprising a clamp for frictionally holding said stem with said disk against said seat, said force-applying means acting to release said clamp and allow said disk to open when said fluid pressure is changed.

4. In the valve of claim 2, said case comprising a body and a control column, said body having an inlet and an outlet separated by a partition, said partition having an opening, said valve seat being slidably mounted in said opening, said column having a guide, said friction device including a split collet secured to said guide, said valve closure having a disk and a stem, said disk being engageable with said seat, said stem passing through said guide and said collet, said column having an operating cylinder, said force-applying means including a main piston in said cylinder, a main spring in said cylinder between an end thereof and said main piston, said main piston having a clamp member, said clamp member and said split collet having engageable bevelled surfaces, a compensating spring operating between said clamp member and an abutment on said stem.

References Cited

UNITED STATES PATENTS 1,733,528  10/1929  Davis _____ 137—494

HENRY T. KLINKSIEK, *Primary Examiner.*

R. J. MILLER, *Assistant Examiner.*